United States Patent [19]
Brautaset et al.

[11] 3,829,050
[45] Aug. 13, 1974

[54] SUSPENSION MEANS FOR AWNING HOUSING

[76] Inventors: Steinar Brautaset, 2040 Klofta, Bakke 77; Finn Otterbeck, Gravdalsvn. 12b, Oslo 7, both of Norway

[22] Filed: Dec. 12, 1972

[21] Appl. No.: 314,454

[30] Foreign Application Priority Data
Dec. 30, 1971 Norway.............................. 4986/71

[52] U.S. Cl. .............................................. 248/223
[51] Int. Cl. ........................................... F16m 13/02
[58] Field of Search ............... 160/19; 248/223, 225

[56] References Cited
UNITED STATES PATENTS
1,039,903 10/1912 Crane ............................ 248/223 X
1,386,715 9/1921 Lewin ................................. 160/19

FOREIGN PATENTS OR APPLICATIONS
1,008,991 11/1965 Great Britain ..................... 248/225

Primary Examiner—William H. Schultz
Attorney, Agent, or Firm—Cushman, Darby & Cushman

[57] ABSTRACT

Suspension means for awning housing of the type which securely locks the housing in place and does not permit the housing to be displaced in lateral direction, and makes it possible for unqualified people to mount the awning.

1 Claim, 3 Drawing Figures

PATENTED AUG 13 1974  3,829,050

SUSPENSION MEANS FOR AWNING HOUSING

The present invention relates to a suspension means for awning housing. As a rule, modern awnings are provided with housings, that is to say the awning cloth or fabric is rolled up onto a tube and is concealed within an awning housing. This is done in order to protect the fabric and mechanism from the elements and from dirt.

Previously known suspension means are characterized in that the securing device is located in the end pieces of the housing or in that they consist of clamping irons, or by shelf-like means beneath the housing, or in that the housing is screwed fast through the rear face of the housing wall.

Figure 1:
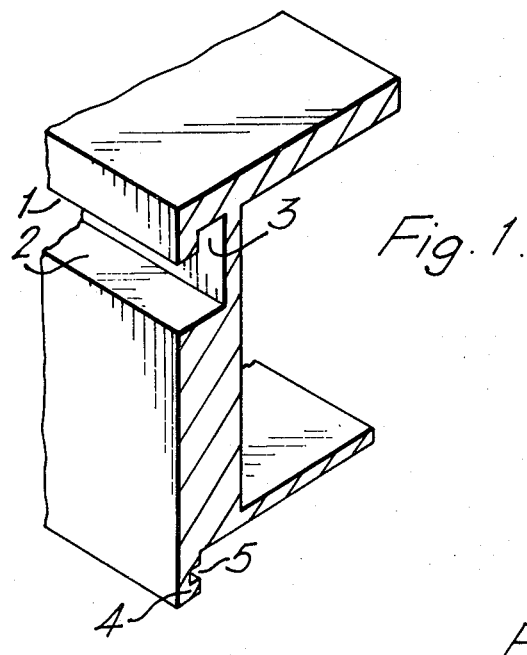
FIG. 1 is a perspective view of an awning housing.
Figure 2:
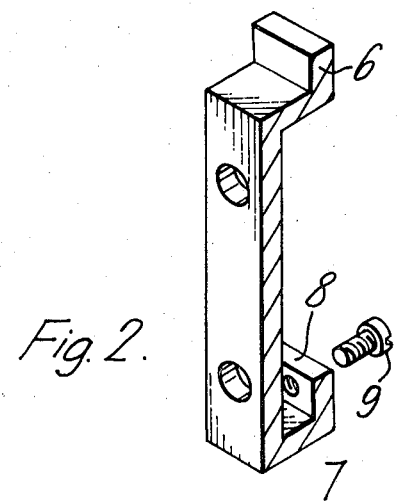
FIG. 2 is a perspective view of a securing bracket.
Figure 3:
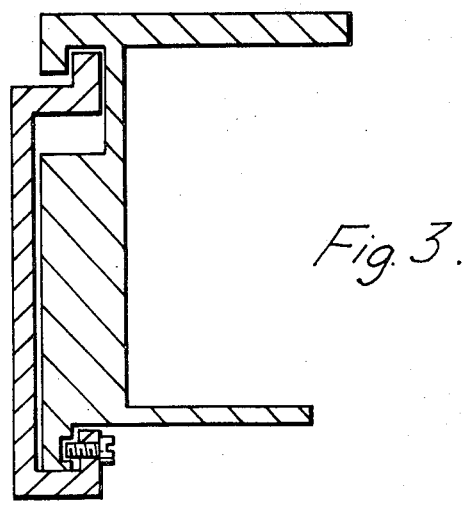
FIG. 3 is a sectional view of an assembly of awning housing and securing bracket.

The present suspension means is characterized in that a continuous groove (1) is provided in the upper rear edge of the housing, FIG. 1. The said groove is open at the rear edge (2), the upper edge (3) being closed on three sides and open at the lower edge. The awning housing is further provided at the lower edge — rear edge — with a continuous lip (4). This is provided in turn with a groove (5) at the front edge. Two or more brackets, of the type shown in FIG. 2 are screwed to the wall or frame whereon the awning is to be suspended. These are formed such that at the upper edge thereof, they are bent outwardly from the wall and upwardly (6), so as to form a counter piece through the groove in the housing, such that the housing may be suspended on the bracket. The housing may then be adjusted laterally to the desired position, whereafter it is locked in place in that the lower portion (7) of the bracket, which is bent outwardly and upwardly, is provided with a threaded orifice (8) and a screw (9). The lower portion of the bracket engages the lower lip of the housing as seen in FIG. 3. When the screw is secured, the housing is securely locked in place so that it cannot be displaced in lateral direction and nor can it be lifted up from and out of the bracket.

This is of great importance with awnings, since they are frequently subjected to strong winds and must therefore be securely attached to the wall. The said suspension system substantially facilitates mounting and makes it possible for unqualified people to mount the awning. When it is desired to remove the awning housing, the screw is loosened and the housing is lifted upwardly and out from the brackets.

Having described our invention, we claim:

1. Suspension means for awning housing, the means including two parts, namely an awning housing and a securing bracket, the awning housing being provided at the upper rear edge thereof with a continuous groove, characterized in that the groove is open at the rear portion but, at the upper portion, is closed on three sides and open at the lower portion, the awning housing being provided at the lower edge of the rear wall with a continuous lip which, in turn is provided with a groove at the front edge, the securing bracket being bent outwardly and upwardly at the upper edge thereof, and also bent outwardly and upwardly at the lower edge thereof, and the front edge is provided with a threaded orifice and a screw, so that the bracket is adapted to the recesses of the housing whereby the housing may be suspended on the bracket and the lip passes down in the lower edge of the bracket so that the lip and bracket may be interlocked in that the screw is secured to the groove.

* * * * *